A. S. DUFFIES & F. MEAD.
CUSHIONED WHEEL.
APPLICATION FILED MAR. 31, 1916.
1,276,628.
Patented Aug. 20, 1918.
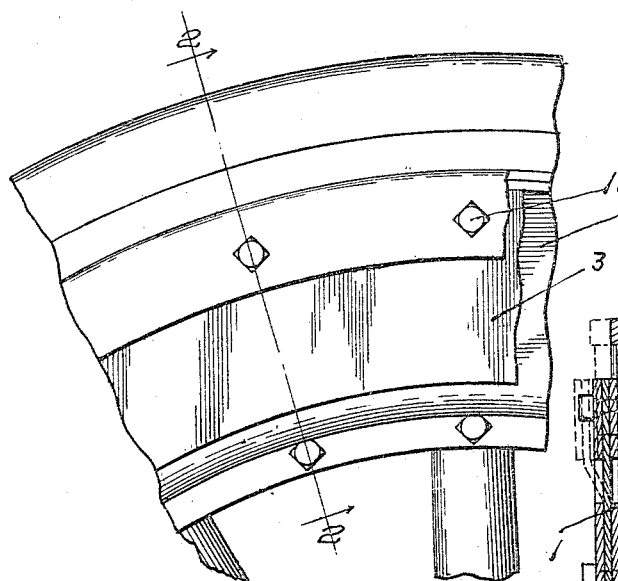
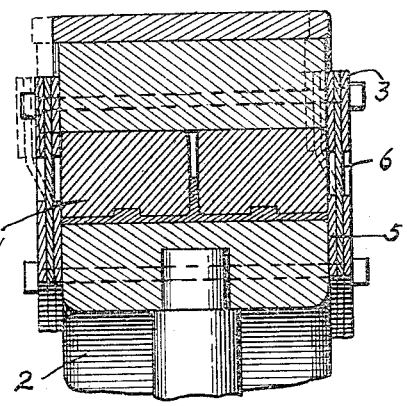
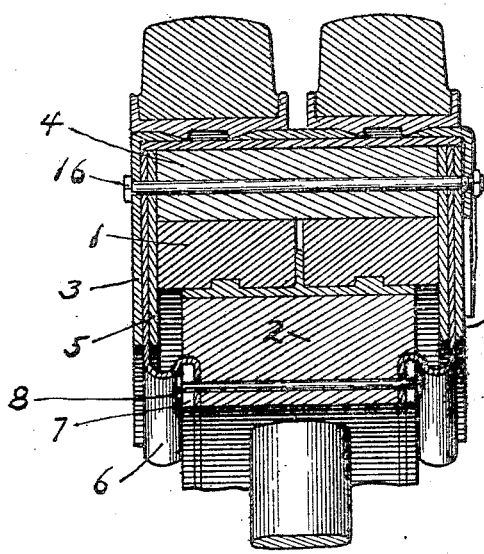
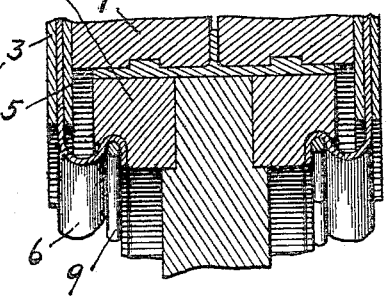
Witness:
R. L. Torrington
Inventors
Alfred S. Duffies
and Francis Mead
By Albert Scheidt, Atty.

UNITED STATES PATENT OFFICE.

ALFRED S. DUFFIES, OF MARKESAN, WISCONSIN, AND FRANCIS MEAD, OF CHICAGO, ILLINOIS.

CUSHIONED WHEEL.

1,276,628.

Specification of Letters Patent. Patented Aug. 20, 1918.

Application filed March 31, 1916. Serial No. 87,902.

*To all whom it may concern:*

Be it known that we, ALFRED S. DUFFIES, residing at Markesan, in the county of Green Lake and State of Wisconsin, and FRANCIS MEAD, residing at Chicago, in the county of Cook and State of Illinois, both citizens of the United States, have invented certain new and useful Improvements in Cushioned Wheels; and we do hereby declare the following to be a full, clear, and exact description of the invention, such as will enable others skilled in the art to which it appertains to make and use the same.

Our invention relates to the class of cushioned wheels having resilient means interposed between inner and outer rim members, one of its main objects being the providing of an inclosure which will prevent the entrance of dust, rain, mud or the like into the space between the rim members. Another general object is the affording of a substantially airtight inclosure for the cushioning means so as to afford a cheap equivalent for the pneumatic tire as an auxiliary to the cushions. More particularly, our invention aims to provide simple, inexpensive and readily applied means for guarding the space between inner and outer wheel rims to prevent the entrance of foreign matter: to provide airtight flexible flanges which will coöperate with the inner and outer rims in inclosing the annular space between the said rims, so that a cushion of air may be maintained in the said space: to provide simple means for using such guards or flexible flanges in wheel constructions employing side plates on either the inner or the outer rim or both, and to provide simple means for simultaneously securing the guards or flexible flanges and the side plates to the rims carrying the latter: to provide for a speedy removing and replacing of the flexible guards or flanges, and to protect such guards or flanges from mechanical injury.

Further objects will appear from the following specification and from the accompanying drawings, in which—

Figure 1 is a fragmentary side elevation of a wheel equipped with our invention.

Fig. 2 is a transverse section through Fig. 1 along the line 2—2.

Fig. 3 is a fragmentary section showing another method of securing the flexible guards to the inner rim of the wheel.

Fig. 4 is a fragmentary section showing another embodiment of our invention.

While our invention may be applied with substantially equal facility to widely varying types of wheel constructions, it is particularly adapted to wheels having rubber cushioning elements disposed in annular formation between inner and outer rim members. For example, Figs. 1 and 2 show our invention as applied to the wheel construction disclosed in United States Patent No. 1,195,379 granted to Francis Mead, Aug. 22, 1916, which construction embodies rubber cushions 1 carried by the inner rim 2 and projecting laterally beyond the latter into engagement with annular side plates 1 carried by the outer rim 4. In equipping such wheels with our invention, we preferably substitute for a side plate of single thickness (as disclosed in the said pending application) a pair of plates 3 and 5 having alined perforations for receiving the shanks of the bolts 16 which secure these plates to the outer rim 4'. Between the plates 3 and 5 at each side of the wheel we clamp a flexible guard 6 of rubberized or cravenetted fabric or the like, which fabric projects radially inward from the said plates so as to span the space between the inner and outer rims. At or near its radially inner edge, the guard 6 is suitably secured to the inner rim 2, as by clamping rings 7 fastened by bolts 8. However, the fabric or guard is not stretched taut, but preferably has sufficient slack in it to permit considerable relative movement of the inner and outer rim members radially of the wheel without straining the fabric. It is also preferably of such material that the weave will permit of some distortion, thereby allowing such relative circumferential movement of the inner and outer rims as is needed during the effective operation of the wheel. To prevent the formation of creases or folds in the fabric which might crack the latter and which also would render it more liable to damage by contact with stones and the like, this fabric is preferably of such a width radially of the wheel as to permit of a decided bulge or bend. When the wheel is in service, the movement of the rim parts will, during each revolution of a wheel, tend successively to compress the air inclosed between the cushions 1, the fabric 6 and the rim members 2 and 4 at different points along the fabric. This compressing will force the fabric outwardly wherever it may have been contracted, and this action may be increased by compressing the air in the said inclosed annular space at each side of the wheel. Moreover, by increasing this compression, each of the said annular chambers may be made to act substantially after the manner of a pneumatic tire, thereby producing a cushioning effect which will coöperate with the resiliency for the wheel when the latter is in use.

Instead of securing the radially inner portion of the guard fabric to the inner rim by clamping rings 7 fastened by bolts 8, this fabric may be held by resilient split rings 9 entering grooves in the inner rim, as shown in Fig. 3, thereby simplifying the construction. Or, the radially inner portion of the fabric may be clamped between a pair of relatively overlapped plates carried by the inner rim, as shown in Fig. 4, in which case the fabric may be relatively shorter while still permitting the required side play as indicated by dotted lines in Fig. 4, in which figure the dotting has been restricted to certain parts, to avoid a confusion in the drawings. So also, it will be obvious that other changes might be made in the construction and arrangement without departing from the spirit of our invention, hence we do not wish to be limited either in materials or otherwise to the above disclosure. Nor do we wish to be limited to the employment of such flexible guards merely for affording air chambers adapted to augment the resiliency of the wheel, or merely for preventing mud or dust from entering the annular space between the rim members and the side plates, that is to say, the space in which the rubber cushions 1 are mounted. It will be obvious from the drawings that if the guard fabrics were omitted, dirt, stones and the like would readily enter between the cushions and both the rim members and the side plates; consequently, the operation of such wheels would be attended not only by the noise of the grinding of such foreign matter between the adjacent parts, but also by the wear on these parts, all of which are effectively avoided by the employment of our invention. Where the inclosed air is to be compressed, the guard may preferably be made of relatively heavy material, but where the guard is only to serve as part of a moisture and dirt excluding housing, it may be made of thin fabric. In either case, it will be evident that by removing either both the outer side flange on the outer rim, and one of the rings on the inner rim, the fabric may readily be removed and replaced when necessary.

We claim as our invention:

In a vehicle wheel, the combination with inner and outer rims disposed for relative motion both radially and laterally of the wheel, of resilient cushions interposed therebetween and each normally flush with a side of one of said rims, of a pair of inflexible annular rings carried on each side of the last named rim, the inner of said rings extending flush with and opposing the said sides and contacting laterally with said cushions, an annular guard of flexible fabric clamped between each pair of said rings and extending radially of the wheel past a portion of the other rim, and means for securing said guard to the last named rim.

ALFRED S. DUFFIES.
FRANCIS MEAD.

Copies of this patent may be obtained for five cents each, by addressing the "Commissioner of Patents, Washington, D. C."